US009115602B2

(12) United States Patent
Malandra et al.

(10) Patent No.: US 9,115,602 B2
(45) Date of Patent: Aug. 25, 2015

(54) EXHAUST DIFFUSER INCLUDING FLOW MIXING RAMP FOR A GAS TURBINE ENGINE

(71) Applicants: Anthony J. Malandra, Orlando, FL (US); John A. Orosa, Palm Beach Gardens, FL (US)

(72) Inventors: Anthony J. Malandra, Orlando, FL (US); John A. Orosa, Palm Beach Gardens, FL (US)

(73) Assignee: Siemens Aktiengesellschaft, München (DE)

( * ) Notice: Subject to any disclaimer, the term of this patent is extended or adjusted under 35 U.S.C. 154(b) by 128 days.

(21) Appl. No.: 14/053,642

(22) Filed: Oct. 15, 2013

(65) Prior Publication Data

US 2014/0041357 A1 Feb. 13, 2014

Related U.S. Application Data

(63) Continuation-in-part of application No. 13/276,346, filed on Oct. 19, 2011, now Pat. No. 8,756,936.

(51) Int. Cl.
*F02K 1/78* (2006.01)
*B63H 11/10* (2006.01)
*F01D 25/30* (2006.01)

(52) U.S. Cl.
CPC .......... *F01D 25/30* (2013.01); *F05D 2240/127* (2013.01)

(58) Field of Classification Search
CPC ........................... F01D 25/30; F01D 2240/127
USPC ......... 60/770; 239/265.19; 415/1, 211.2, 914, 415/224.5
See application file for complete search history.

(56) References Cited

U.S. PATENT DOCUMENTS

| | | | | |
|---|---|---|---|---|
| 3,058,302 | A | 10/1962 | Kuzyk | |
| 3,557,830 | A | 1/1971 | Raw | |
| 3,696,617 | A * | 10/1972 | Ellis | 60/229 |
| 4,292,803 | A * | 10/1981 | Prior | 60/230 |
| 4,581,890 | A | 4/1986 | Giraud | |
| 4,930,308 | A | 6/1990 | Fage | |
| 4,971,768 | A | 11/1990 | Ealba et al. | |
| 5,603,605 | A | 2/1997 | Fonda-Bonardi | |
| 6,233,920 | B1 * | 5/2001 | Presz et al. | 60/230 |
| 6,896,475 | B2 | 5/2005 | Graziosi et al. | |
| 7,731,475 | B2 | 6/2010 | Hardin | |
| 7,980,055 | B2 | 7/2011 | Lindenfeld | |
| 8,756,936 | B2 * | 6/2014 | Orosa et al. | 60/770 |
| 2005/0066647 | A1 | 3/2005 | Wiebe et al. | |
| 2010/0303607 | A1 | 12/2010 | Orosa | |
| 2011/0056179 | A1 | 3/2011 | Orosa | |
| 2011/0058939 | A1 | 3/2011 | Orosa et al. | |

* cited by examiner

*Primary Examiner* — Hoang Nguyen

(57) ABSTRACT

A turbine exhaust diffuser for a gas turbine engine. The diffuser includes a flow ramp positioned on an ID flowpath boundary within a flowpath of the diffuser. The flow ramp extends circumferentially about the hub and includes a downstream, radially outward point that extends radially outward further from the ID flowpath boundary than an upstream, radially outward point that is positioned upstream from the downstream, radially outward point. A wavy portion is located at the downstream, radially outward point of the flow ramp. The wavy portion includes a circumferentially extending, undulating surface defined by alternating axially extending crests and troughs.

20 Claims, 7 Drawing Sheets

FIG. 11
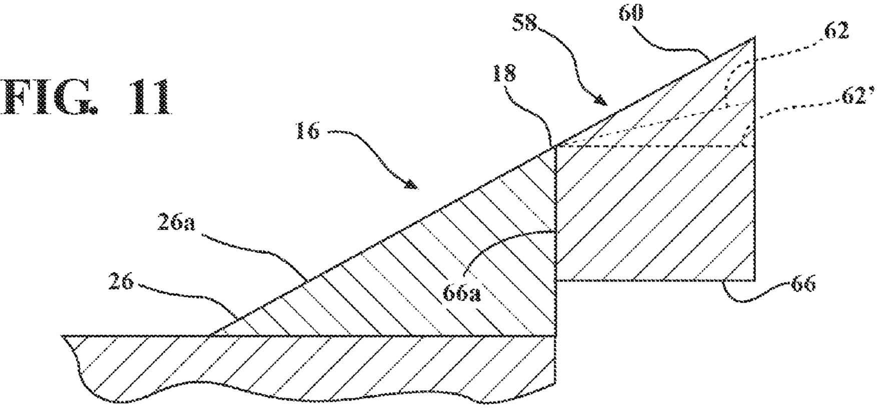
FIG. 12
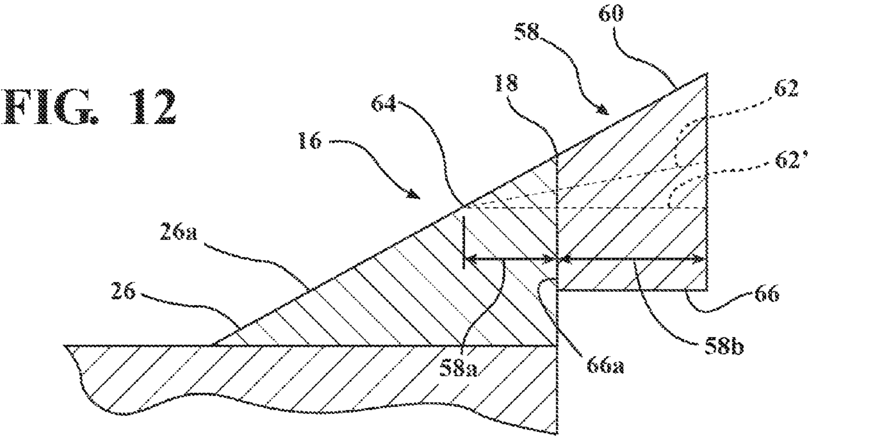
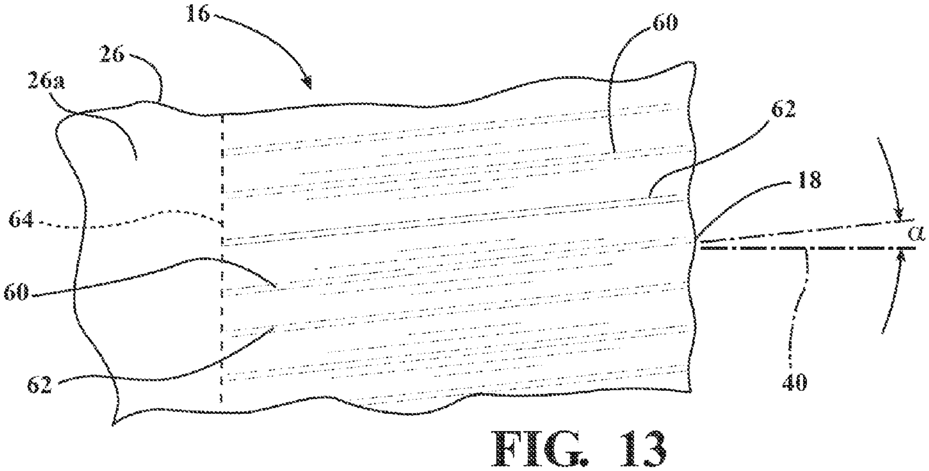
FIG. 13

EXHAUST DIFFUSER INCLUDING FLOW MIXING RAMP FOR A GAS TURBINE ENGINE

CROSS-REFERENCE TO RELATED APPLICATIONS

This application is a continuation-in-part of and claims priority to U.S. patent application Ser. No. 13/276,346, filed Oct. 19, 2011, which application is herein incorporated by reference in its entirety as if fully set forth herein.

FIELD OF THE INVENTION

This invention is directed generally to gas turbine engines, and more particularly to flowpaths in exhaust diffusers in gas turbine engines.

BACKGROUND

Typically, gas turbine engines include a compressor for compressing air, a combustor for mixing the compressed air with fuel and igniting the mixture, and a turbine blade assembly positioned downstream from the combustor for producing power. Turbine exhaust gases are directed downstream and into a diffuser before being exhausted from the gas turbine engine. Diffusers typically operate most efficiently with uniform inlet conditions, such as, flat total pressure radial distributions and low swirl. Nonetheless, when turbine engines are modified to run at higher power levels, the result often is that the turbine exit total pressure profile becomes hub strong. The hub strong pressure profile tends to pull flow away from an exhaust diffuser OD flowpath and cause flow separation at the OD flowpath.

SUMMARY OF THE INVENTION

In accordance with an aspect of the invention, a turbine exhaust diffuser is provided for a gas turbine engine having a turbine section. The exhaust diffuser comprises a flowpath located downstream of the turbine section wherein the flowpath is defined at least in part by a turbine casing forming an OD flowpath boundary; and the flowpath is defined at least in part by a hub forming an ID flowpath boundary. A flow ramp positioned in the flowpath on the ID flowpath boundary, wherein the flow ramp extends circumferentially about the hub and includes a downstream, radially outward point that extends radially outward further from the ID flowpath boundary than an upstream, radially outward point that is positioned upstream from the downstream, radially outward point. A wavy portion is located at the downstream, radially outward point of the flow ramp. The wavy portion includes a circumferentially extending, undulating surface defined by alternating axially extending crests and troughs.

The flow ramp may define a continuous smooth surface in the circumferential direction, and the wavy portion may extend axially downstream from the continuous smooth surface.

The flow ramp may terminate at the radially outward point and the wavy portion may comprise a ramp appendage having an upstream end attached to the flow ramp at the radially outward point, and the ramp appendage may extend axially downstream from the flow ramp. The continuous smooth surface of the flow ramp may be oriented at a radial outward angle relative to a longitudinal axis of the exhaust diffuser, and the crests may be defined by the ramp appendage and oriented at generally the same angle as the continuous smooth surface of the flow ramp. The troughs of the ramp appendage may be oriented at a radial outward angle relative to the longitudinal axis of the exhaust diffuser that is less than the angle defined by the crests of the ramp appendage. The troughs of the ramp appendage may be oriented generally parallel to the longitudinal axis of the exhaust diffuser.

The wavy portion may include a first, upstream section formed in the flow ramp, located upstream from the downstream, radially outward point, and the upstream section may be defined by crests forming an axial extension of the continuous smooth surface and troughs may form axially extending recesses that extend in a radially inward direction relative to the crests. The wavy portion may include a second, downstream section, and the second, downstream section may define crests and troughs extending axially from respective crests and troughs of the first, upstream section of the wavy portion. The second, downstream section may be formed by a ramp appendage having an upstream end attached to the flow ramp at the radially outward point and extending downstream from the flow ramp, wherein the ramp appendage may define crests and troughs extending axially from respective crests and troughs of the upstream section of the wavy portion. The crests of the first, upstream section may be oriented at a radial outward angle relative to a longitudinal axis of the exhaust diffuser, and the crests of the second, downstream section may be oriented generally parallel to the longitudinal axis of the exhaust diffuser.

The crests and troughs of the wavy portion may extend substantially the entire axial length of the flow ramp.

The crests and troughs of the wavy portion may be oriented at an angle, in the circumferential direction, relative to the longitudinal axis.

In accordance with another aspect of the invention, a turbine exhaust diffuser is provided for a gas turbine engine having a turbine section. The exhaust diffuser comprises a flowpath located downstream of the turbine section for receiving an expanding exhaust gases from the turbine section wherein the flowpath is defined at least in part by a turbine casing forming an OD flowpath boundary, and the flowpath is defined at least in part by a hub forming an ID flowpath boundary. A flow ramp is positioned in the flowpath on the ID flowpath boundary, wherein the flow ramp extends circumferentially about the hub and includes a downstream, radially outward point that extends radially outward further from the ID flowpath boundary than an upstream, radially outward point that is positioned upstream from the downstream, radially outward point. A wavy portion is located at the downstream, radially outward point of the flow ramp. The wavy portion includes a circumferentially extending, undulating surface defined by alternating axially extending crests and troughs, wherein the crests are oriented at a first radial outward angle relative to the longitudinal axis and the troughs are oriented at a second radial outward angle relative the longitudinal axis that is less than the first radial outward angle.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 11 is a side view of a third alternative configuration for the wavy edge flow ramp;

FIG. 12 is a side view of a fourth alternative configuration for the wavy edge flow ramp;

FIG. 13 is an additional alternative configuration of the wavy edge ramp, illustrated in plan view taken in the direction depicted by line 13-13 in FIG. 8A, and depicting a modification of the flow ramp shown in FIG. 8A.

DETAILED DESCRIPTION OF THE INVENTION

Figure 1:
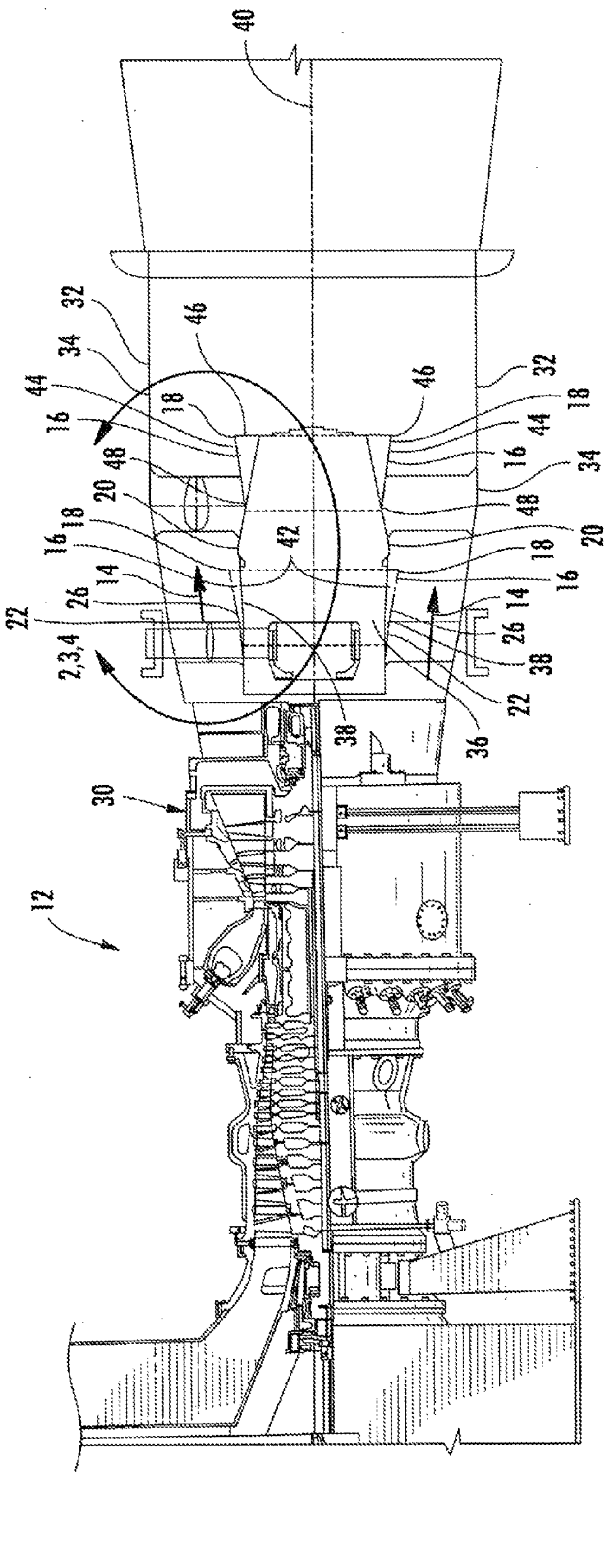
FIG. 1 is a partial cross-section of a turbine engine having features according to the instant invention.

As shown in FIGS. 1-6, this invention is directed to a turbine exhaust diffuser adjustment system 10 for a gas turbine engine 12 capable of altering the flow 14 of turbine exhaust gases. The turbine exhaust diffuser adjustment system 10 may be formed from one or more flow ramps 16 positioned in a flowpath to alter the flow of exhaust gases. The flow ramp 16 may be a generally cylindrical body for redirecting exhaust gas flow. The flow ramp 16 may include a downstream, radially outward point 18 that extends radially outward further from an ID flowpath boundary 20 than an upstream, radially outward point 22 that is positioned upstream from the downstream, radially outward point 18. The flow ramp 16 may be adjustable such that an angular position 24 of a radially outer surface 26 of the flow ramp 16 may be adjusted relative to the ID flowpath boundary 20, thereby enabling the flowpath 28 to be changed, such as by being increased or decreased, during turbine operation to enhance the efficiency of the turbine engine 12 throughout its range of operation.

Figure 2:
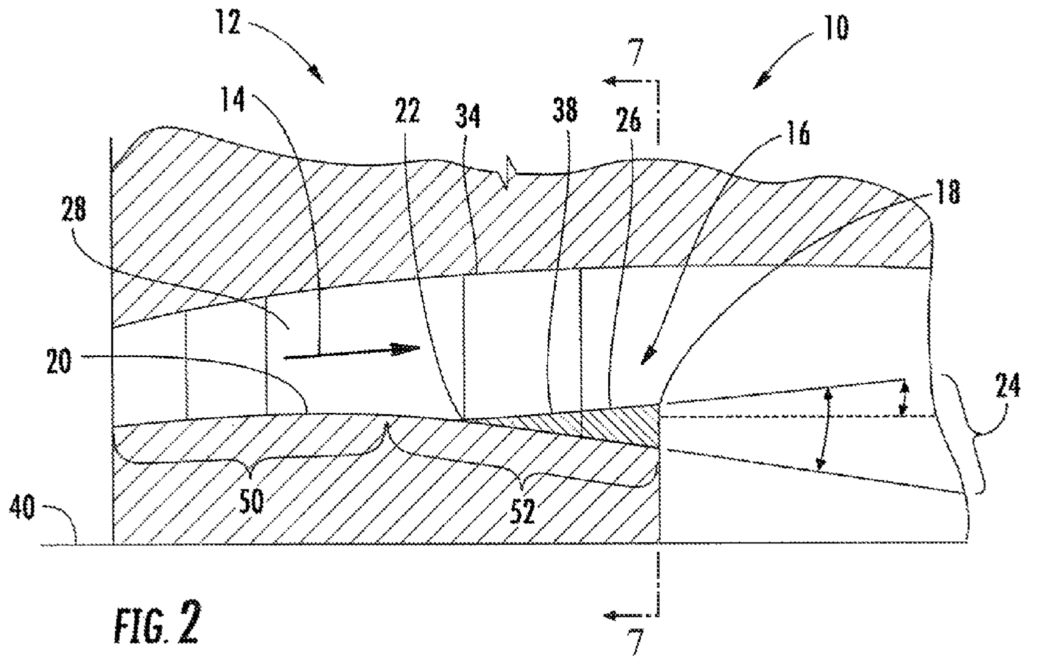
FIG. 2 is a detailed side view of a turbine exhaust diffuser adjustment system with a single flow ramp taken in FIG. 1 at detail 2.
Figure 3:
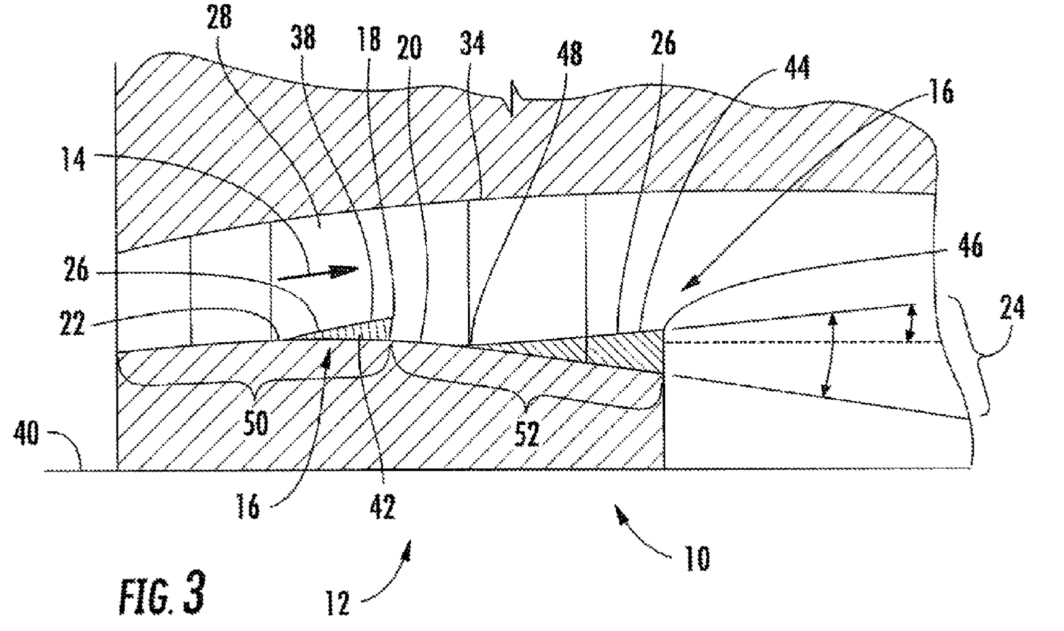
FIG. 3 is a detailed side view of another embodiment of the turbine exhaust diffuser adjustment system with multiple flow ramps taken in FIG. 1 at detail 3.

As shown in FIGS. 2 and 3, the turbine exhaust diffuser adjustment system 10 for the gas turbine engine 12 may include one or more flowpaths 28 downstream of one or more turbine assemblies 30. The flowpath 28 may be defined at least in part by a turbine casing 32 forming an OD flowpath boundary 34. The flowpath 28 may also be defined in part by a hub 36 forming the ID flowpath boundary 20. The hub 36 and turbine casing 32 may be generally cylindrical. The turbine exhaust diffuser adjustment system 10 may include one or more flow ramps 16. A first flow ramp 38 may be positioned in the flowpath 28. The first flow ramp 38 may include a downstream, radially outward point 18 that extends radially outward further from the ID flowpath boundary 20 than an upstream, radially outward point 22 that is positioned upstream from the downstream, radially outward point 18. In particular, the downstream, radially outward point 18 of the first flow ramp 38 may extend radially outward from a longitudinal axis 40 a distance greater then the upstream, radially outward point 22. As such, the first flow ramp 38 redirects the flow 14 within the flowpath 28 with a radially outward vector to more equally spread the flow 14 between the ID and OD flowpath boundaries 20, 34.

Figure 4:
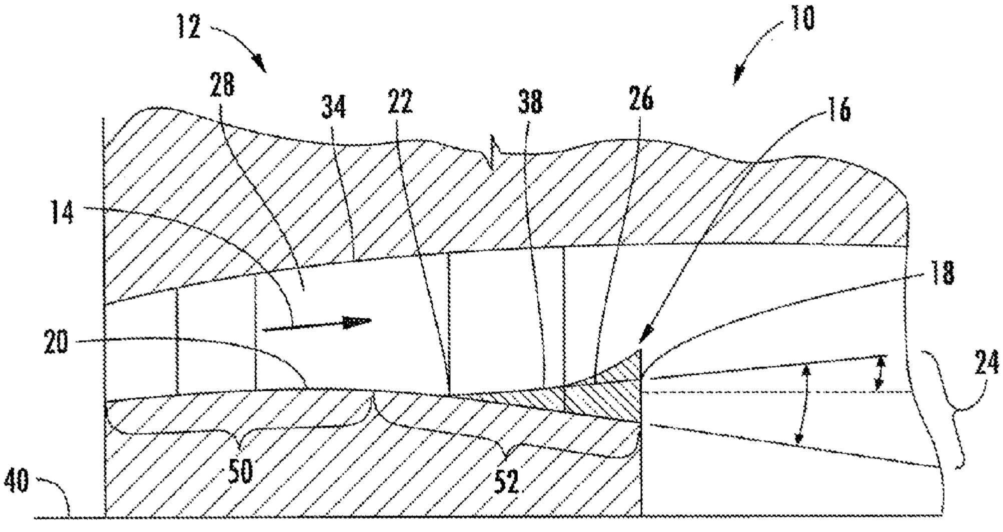
FIG. 4 is a detailed side view of yet another embodiment of the turbine exhaust diffuser adjustment system with a curved outer surface taken in FIG. 1 at detail 4.

As shown in FIG. 4, the first flow ramp 38 may be generally cylindrical about a longitudinal axis 40 of the turbine engine 12 and may extend generally along the longitudinal axis 40. The first flow ramp 38 may be a ring with a generally conical outer surface 26. An inner surface 42 of the first flow ramp 38 may be configured to fit on the ID flowpath boundary 20. The upstream, radially outward point 18 may be configured to also contact the ID flowpath boundary 20, as shown in FIGS. 2 and 3. In another embodiment, as shown in FIG. 4, the first flow ramp 38 may be a ring with a generally outwardly curved outer surface 26.

Figure 6:
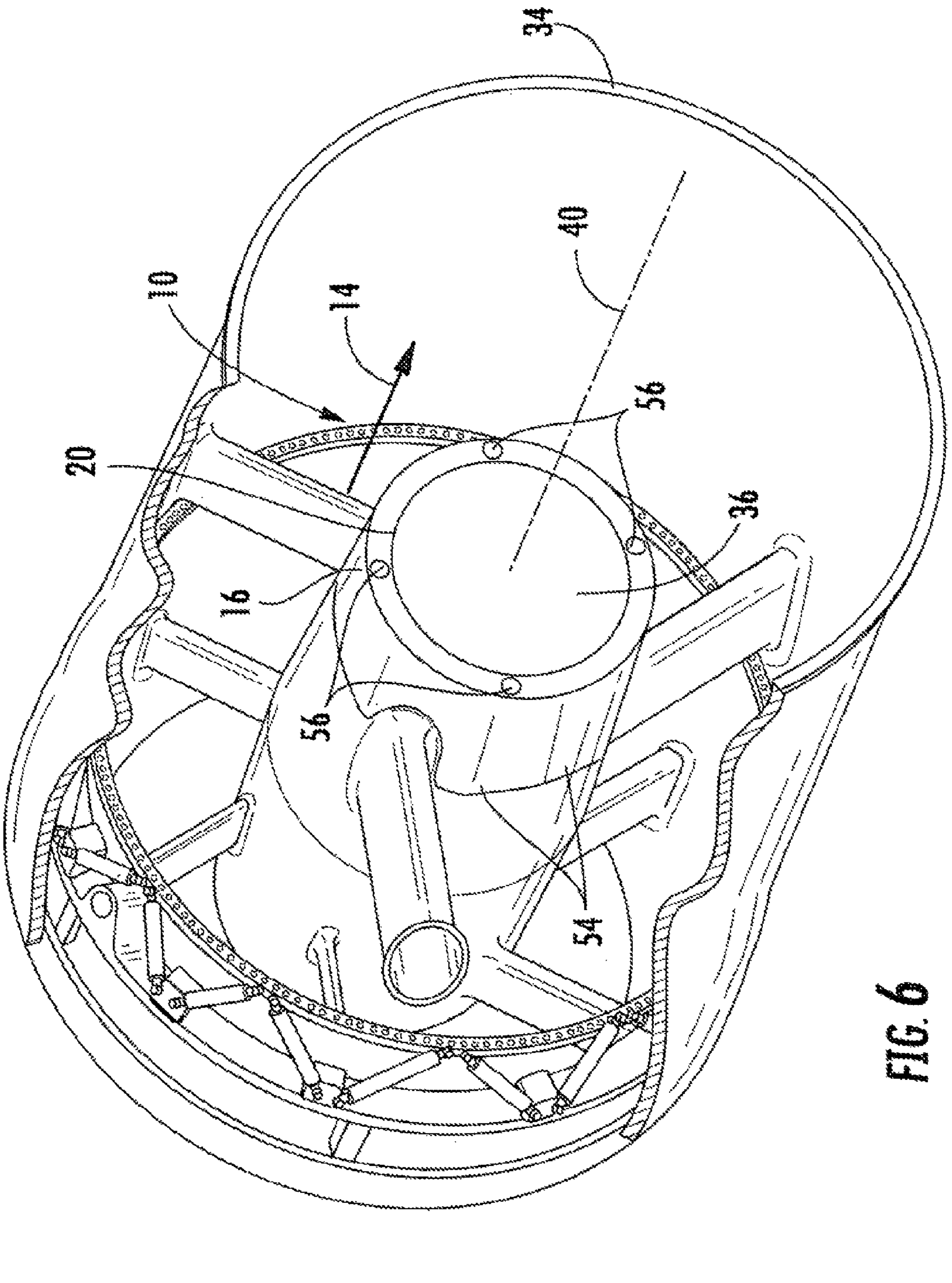
FIG. 6 a perspective view of a flow ramp of the turbine exhaust diffuser adjustment system with an actuator system configured to assist adjustment of the flow ramp.
Figure 7:
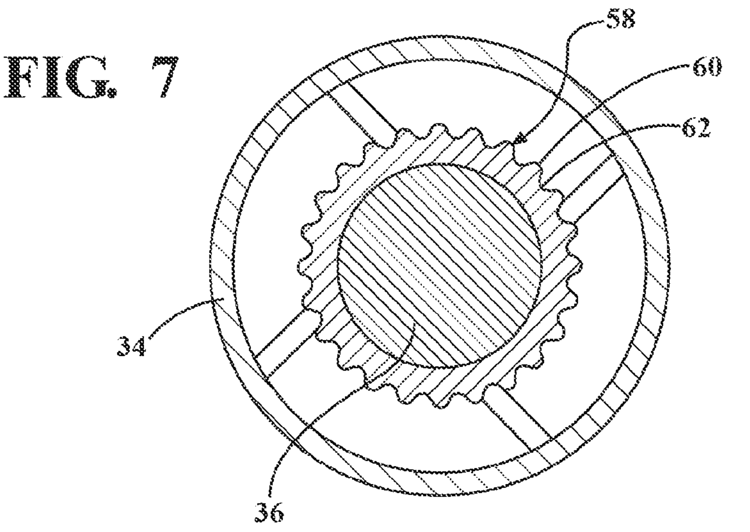
FIG. 7 is an axial cross-sectional view, viewed in an upstream direction, of another embodiment illustrating a wavy edge flow ramp.

The first flow ramp 38 may be adjustable such that an angular position 24 of the radially outer surface 26 of the first flow ramp 38 may be adjusted relative to the ID flowpath boundary 20, thereby enabling the flowpath 28 to be redirected during turbine operation and changing the flow 14 through the flowpath 28 to increase the efficiency of a downstream diffuser. In one embodiment, the flow ramp 16 may be formed from a plurality of overlapping flaps 54, as shown in FIG. 6, whose angular position is controlled with one or more actuators 56, which may be, but are not limited to being, a hydraulic actuator. The first flow ramp 38 may be adjustable with any component or multiple components capable of changing the angular position 24 of the radially outer surface 26 while the turbine engine is at rest and under operating conditions. The first flow ramp 38 may be formed from any appropriate configuration.

The turbine exhaust diffuser adjustment system 10 may also include a second flow ramp 44 positioned in the flowpath 28. The second flow ramp 44 may include a downstream, radially outward point 46 that extends radially outward further from the ID flowpath boundary 20 than an upstream, radially outward point 48 that is position upstream from the downstream, radially outward point 46. The downstream, radially outward point 46 of the flowpath 28 may extend radially outward from the longitudinal axis 40 a distance greater then the upstream, radially outward point 48 of the flowpath 28.

Figure 5:
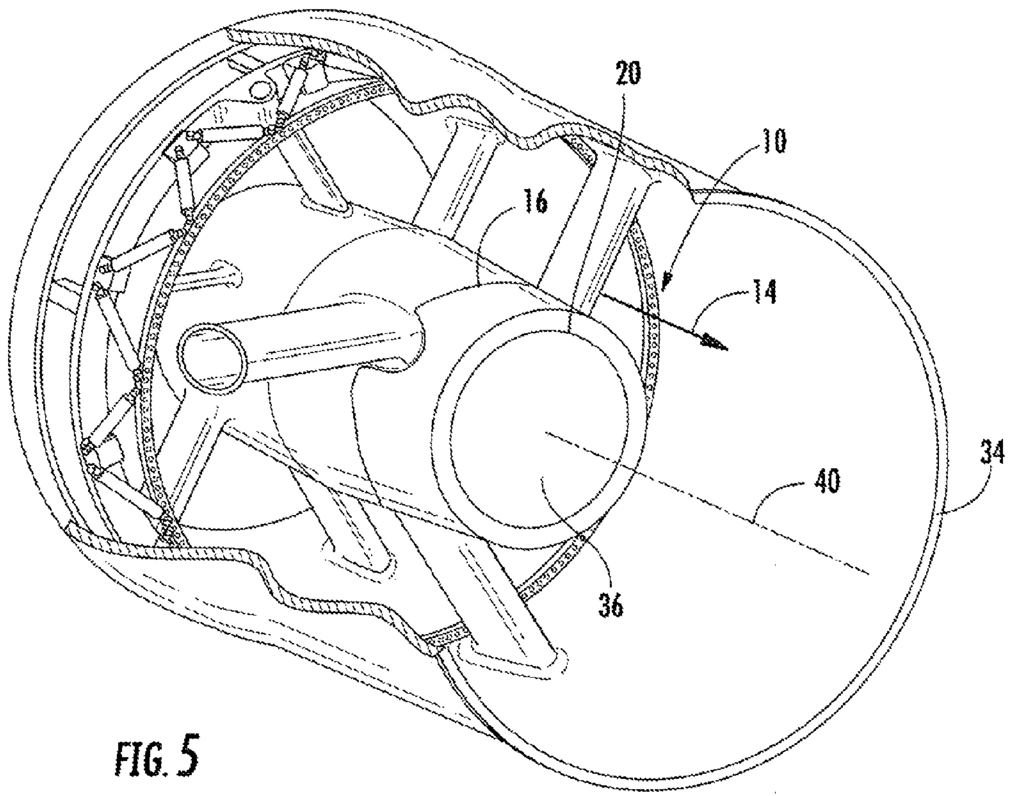
FIG. 5 is a perspective view of a flow ramp of the turbine exhaust diffuser adjustment system.

As shown in FIG. 5, the second flow ramp 44 may be generally cylindrical about a longitudinal axis 40 of the turbine engine 12 and may extend generally along the longitudinal axis 40. The second flow ramp 44 may be in the shape of a ring with a generally conical outer surface 26.

The second flow ramp 44 may be positioned downstream from the first flow ramp 38. The first flow ramp 38 may be positioned on a portion of the hub 36 forming the ID flowpath boundary 20 with a positive slope moving in a downstream direction, and the second flow ramp 44 may be positioned on a portion of the hub 36 forming the ID flowpath boundary 20 with a negative slope moving in a downstream direction. The first flow ramp 38 may be positioned on an upstream portion 50 of the hub 36 forming the ID flowpath boundary 20 with a positive slope of between about one and about six degrees, and in at least one embodiment may be about two degrees moving in a downstream direction. The second flow ramp 44 may be positioned on a downstream portion 52 of the hub 36 forming the ID flowpath boundary 20 with a negative slope of between about zero degrees and about nine degrees, and in at least one embodiment, may be about six degrees moving in a downstream direction.

The second flow ramp 44 may be adjustable such that an angular position 24 of the radially outer surface 26 of the second flow ramp 44 may be adjusted relative to the ID flowpath boundary 20, thereby enabling the flowpath 28 to be changed during turbine operation and enabling the flow 14 through the flowpath 28 to be redirected to increase the efficiency of a downstream diffuser. The second flow ramp 44 may be adjustable with any component or multiple components capable of changing the angular position 24 of the radially outer surface 26 while the turbine engine is at rest and under operating conditions. The second flow ramp 44 may be formed from any appropriate configuration.

During use, the flow ramp 16 may be used to redirect the flow 14 in the flowpath 28 defined by the ID flowpath boundary 20 and the OD flowpath boundary 34, as modified by one or more flow ramps 16. The flow ramp 16 may be adjustable such that the angular position 24 may be changed to change the redirection of exhaust gases near the ID flowpath boundary 20 towards the OD flowpath boundary 34. For instance, a hub strong pressure profile tends to pull flow away from the exhaust diffuser OD flowpath near the OD flowpath boundary 34 and can cause flow separation at that location, which can significantly reduce diffuser performance. The performance of a diffuser operating with a hub strong pressure profile and low swirl can be improved through use of one or more flow ramps 16 that redirects a portion of the flow 14 towards the OD flowpath boundary 34 to relieve separation at the OD flowpath boundary 34. The one or more flow ramps 16 may help balance the downstream radial total pressure profile. The variability of the angular position 24 of the flow ramps 16 enables the effect of the flow ramps 16 to be adjusted to account for different diffuser inlet conditions at different engine loads.

In another example, such as turbine operation during cold day conditions, the pressure profile can become even more hub strong and could benefit from one or more flow ramps 16 with steeper pitches. In another example, on a hot day, base load conditions for the pressure profile tend to become less hub strong, and thus, could benefit from flow ramps 16 having reduced angular positions 24 with a reduced slope.

Referring to FIGS. 7-13, a further embodiment of the invention is illustrated comprising a wavy edge ramp. As seen with particular reference to FIGS. 8 and 8A, the flow ramp 16 may be formed with a wavy portion 58, which may be defined by a height of the ramp surface 26 that varies sinusoidally (FIG. 7), i.e., undulates, extending in the circumferential direction. Generally, the flow ramp 16 defines a continuous smooth surface 26*a* in the circumferential direction, and the wavy portion 58 extends axially downstream from the continuous smooth surface 26*a*, as may be seen in FIG. 8A. For example, the wavy portion 58 may be located at the downstream, radially outward point 18 of the flow ramp 16, and may include at least a first section extending from an upstream point 64 at the smooth ramp surface 26*a* to the radially outward point 18.

The wavy portion 58 may include a circumferentially extending, undulating surface defined by alternating axially extending crests 60 and troughs 62. For example, the crests 60 may form an axial extension of the continuous smooth surface 26*a*, and the troughs 62 may form axially extending recesses that extend in the radial inward direction, where the height of the crests 60 relative to the troughs 62 increases in the axial downstream direction. In a particular configuration, the crests 60 may extend at a radial angle relative to the longitudinal axis 40, i.e., an angle radially outward from a line parallel to the longitudinal axis 40, that is substantially the same as the radial angle of the continuous smooth surface 26, i.e., the troughs 62 may be formed in the continuous smooth surface 26 to form the undulating surface of the wavy portion 58. However, it should be understood that the radial angle of the crests 60 could be different from the radial angle of the continuous smooth surface 26.

Figure 9:
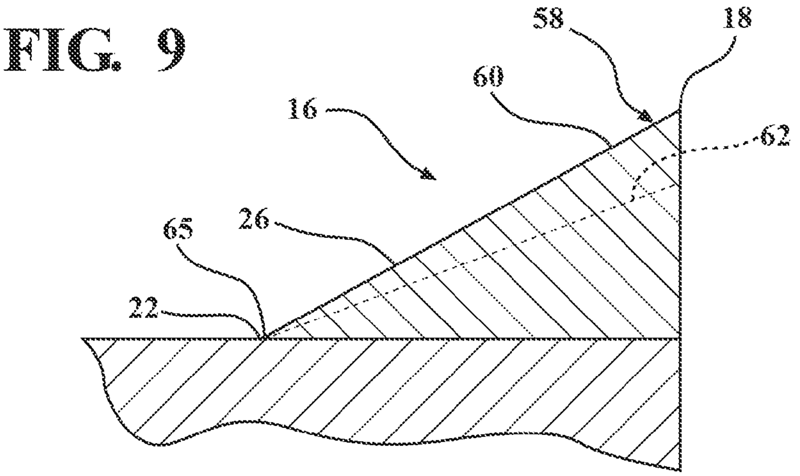
FIG. 9 is a side view of a first alternative configuration for the wavy edge flow ramp.

Referring to FIG. 9 a first alternative configuration of the wavy edge ramp is illustrated. FIG. 9 illustrates a flow ramp 16 including a wavy portion 58 having a circumferentially extending, undulating surface including at least a first section defined by alternating axially extending crests 60 and troughs 62. The troughs 62 may be formed in the ramp surface 26 to form the undulating surface of the wavy portion 58. The wavy portion 58 may extend from an upstream location 65 that can correspond to the upstream, radially outward point 22 of the flow ramp 16 to the downstream, radially outward point 18. Hence, the crests 60 and troughs 62 of the wavy portion 58 may extend substantially the entire axial length of the flow ramp 16.

Figure 10:
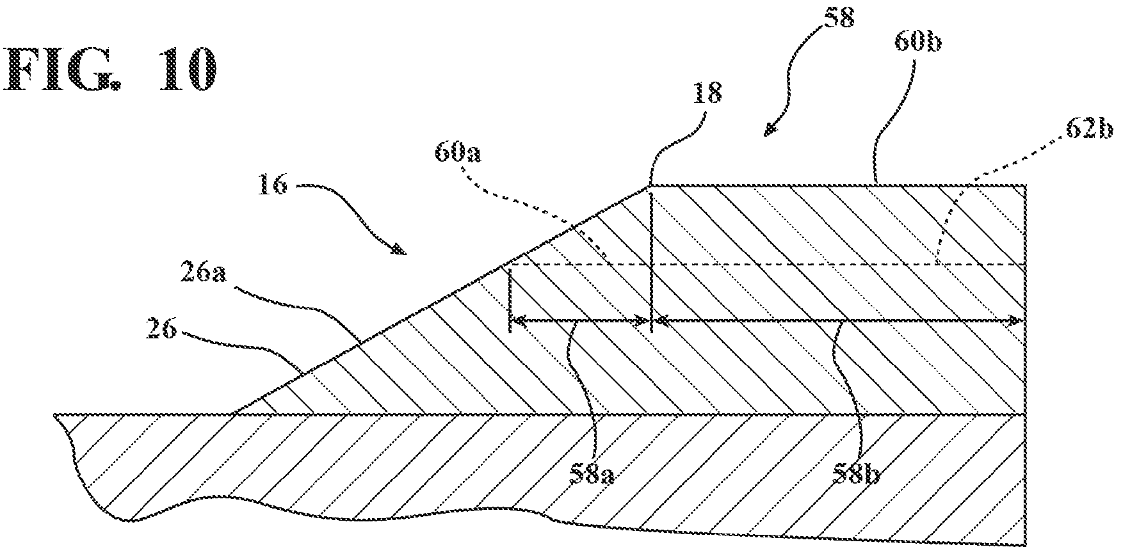
FIG. 10 is a side view of a second alternative configuration for the wavy edge flow ramp.

Referring to FIG. 10, a second alternative configuration of the wavy edge ramp is illustrated. FIG. 10 illustrates a flow ramp 16 including a wavy portion 58 having a circumferentially extending, undulating surface including at least an upstream first section 58*a* formed in the flow ramp, located upstream from the downstream, radially outward point 18. The upstream section can be defined by crests 60*a* forming an axial extension of a continuous smooth surface 26*a* and troughs 62*a* forming axially extending recesses that extend in a radially inward direction relative to the crests 60*a*. The wavy portion 58 further includes a second, downstream section 58*b* that defines crests 60*b* and troughs 62*b* extending axially from respective crests 60*a* and troughs 62*b* of the first, upstream section 58*a* of the wavy portion 58. The crests 60*a* of the first, upstream section 58*a* may be oriented at a radial outward angle relative to the longitudinal axis 40 of the exhaust diffuser, such as at generally the same radial outward angle as the smooth surface 26*a*, and the crests 60*b* of the second, downstream section 58*b* may be oriented generally parallel to the longitudinal axis 40 of the exhaust diffuser.

Referring to FIG. 11, a third alternative configuration of the wavy edge ramp is illustrated. As seen in FIG. 11, the flow ramp 16 may terminate at the radially outward point 18 and the wavy portion 58 comprises a ramp appendage 66 having an upstream end 66*a* attached to the flow ramp 16 at the radially outward point 18, i.e., axially aligned with the radially outward point 18, and the ramp appendage 66 extends axially downstream from the flow ramp 16. Generally, the flow ramp 16 defines a continuous smooth surface 26*a* in the circumferential direction, and the wavy portion 58 extends axially downstream from the continuous smooth surface 26*a*. For example, the wavy portion 58 may be located at the downstream, radially outward point 18 of the flow ramp 16, and may include at least a first section extending downstream from the downstream, radially outward point 18. The wavy portion 58 may include a circumferentially extending, undulating surface defined by alternating axially extending crests 60 and troughs 62. For example, the crests 60 may form an axial extension of the continuous smooth surface 26*a*, and the troughs 62 may form axially extending recesses that extend in the radial inward direction. In a particular configuration, the crests 60 may extend at an angle radially outward relative to the longitudinal axis 40 that is substantially the same as the angle of the continuous smooth surface 26*a*. The troughs 62 may extend at an angle radially outward that is between the angle of the crests 60 and an angle aligned with or parallel to the axis 40 of the exhaust diffuser. In an alternative configuration, the troughs 62 may be oriented generally parallel to the longitudinal axis 40, as depicted by troughs 62'.

Referring to FIG. 12, a fourth alternative configuration of the wavy edge ramp is illustrated. As seen in FIG. 12, the flow ramp 16 may terminate at the radially outward point 18 and the wavy portion 58 comprises a ramp appendage 66 having an upstream end 66*a* attached to the flow ramp 16 at the radially outward point 18, and the ramp appendage 66 extends axially downstream from the flow ramp 16. Generally, the flow ramp 16 defines a continuous smooth surface 26*a* in the circumferential direction, and the wavy portion 58 extends axially downstream from the continuous smooth surface 26*a*. The wavy portion 58 may include a circumferentially extending, undulating surface defined by alternating axially extending crests 60 and troughs 62. The wavy portion 58 may include a first, upstream section 58*a* formed in the flow ramp 16 extending from an upstream end 64 located upstream from the downstream, radially outward point 18, and the upstream section is defined by crests 60*a* forming an axial extension of the continuous smooth surface 26*a* and troughs 62*a* forming axially extending recesses that extend in a radially inward direction relative to the crests 60*a*. In a particular configuration, the crests 60 (60*a*, 60*b*) may extend at an angle radially outward relative to the longitudinal axis 40 that is generally the same as the angle of the continuous smooth surface 26*a*. The troughs 62 may extend at an angle radially outward that is between the angle of the crests 60 and an angle aligned with or parallel to the axis 40 of the exhaust diffuser. In an alternative configuration, the troughs 62 may be oriented generally parallel to the longitudinal axis, as depicted by troughs 62'.

Figure 8:
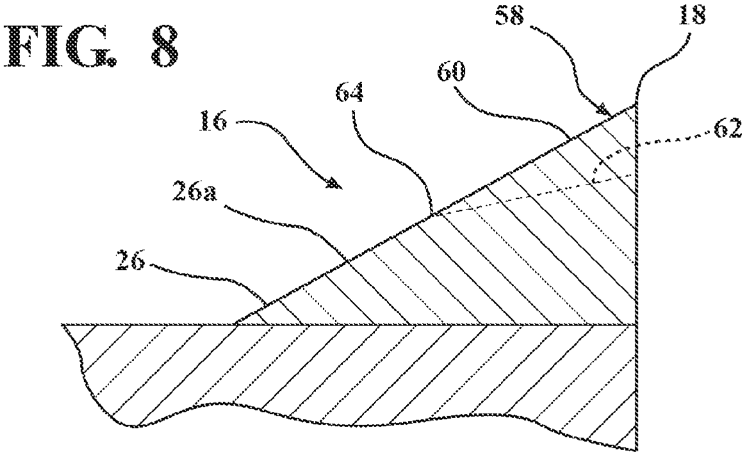
FIG. 8 is a side view of the wavy edge flow ramp.
Figure 8A:
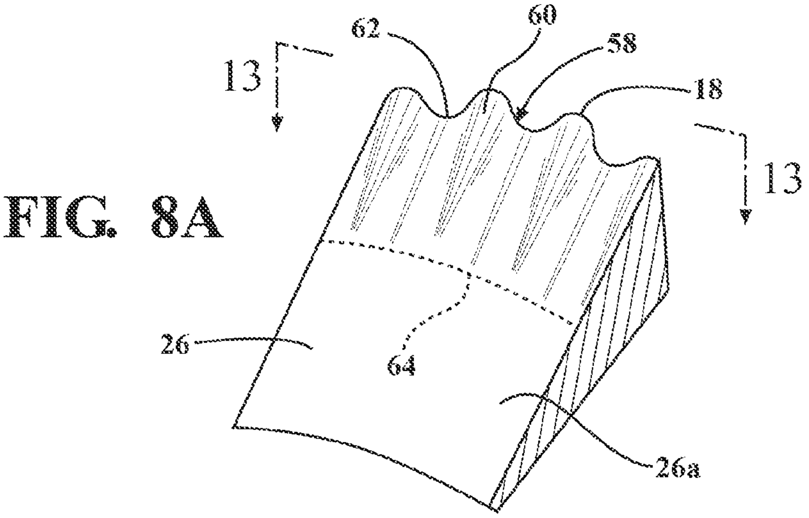
FIG. 8A is a plan view of the ramp of FIG. 8, viewed in a radially inward direction.

Referring to FIG. 13, an additional alternative configuration of the wavy edge ramp is illustrated in plan view as a modification of the flow ramp shown in FIG. 8A. As seen in FIG. 13, the flow ramp 16 is formed with an undulating surface or wavy portion 58 including crests 60 and troughs 62 as described for the various configurations above. In the present configuration, the crests 60 and troughs of the wavy portion 62 are oriented at an angle, in the circumferential direction, relative to the longitudinal axis 40, as depicted by angle a. The circumferentially angled crests 60 and troughs 62 may operate to straighten the flow, or counteract a flow having a component circumferentially angled relative to the longitudinal axis 40, such as to counteract swirl in the flow. That is, the angle a of the crests 60 and troughs 62 may be circumferentially oriented to redirect the flow adjacent to the ramp 16 to be more aligned with the axis 40, and may be circumferentially oriented in an opposite direction to a circumferential component of the flow at the ramp 16.

As seen from the description above, the wavy portion 58 may be formed directly in the flow ramp 16, and/or may comprise a cylindrical section added to the end of the ramp 16. The wavy portion 58 extending to the end of the ramp 16, and/or attached to the end of the ramp 16, can reduce the total pressure loss that may occur as a result of a sudden expansion as the flow leaves the end of the ramp 16. In particular, the wavy portion 58 can act as a flow mixer to entrain more flow into the mixing process than a simple axi-symmetric step at the end of the ramp 16. The additional mixing can result in a total pressure radial profile that is flatter and can improve the static pressure recovery of the diffuser downstream.

It may be understood that although the wavy portion 58 is described in a preferred embodiment as defined by a smoothly varying sinusoidal variation in the surface, a simplified construction may provide a wavy portion formed by linear or flat segments, forming triangular pieces having sides or edges joined at the crests and troughs, such as to reduce manufacturing costs. Further, it should be understood that the configurations for the wavy portion 58 described above may be formed in and/or attached to the surface 26 of any of the flow ramps 16 described above with reference to FIGS. 1-6. That is, the wavy portion may be provided to either or both the upstream or downstream ramps described herein.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A turbine exhaust diffuser for a gas turbine engine having a turbine section, the exhaust diffuser comprising:

a flowpath located downstream of the turbine section;

wherein the flowpath is defined at least in part by a turbine casing forming an OD flowpath boundary;

wherein the flowpath is defined at least in part by a hub forming an ID flowpath boundary;

a flow ramp positioned in the flowpath on the ID flowpath boundary, wherein the flow ramp extends circumferentially about the hub and includes a downstream, radially outward point that extends radially outward further from the ID flowpath boundary than an upstream, radially outward point that is positioned upstream from the downstream, radially outward point; and a wavy portion located at the downstream, radially outward point of the flow ramp, the wavy portion including a circumferentially extending, undulating surface defined by alternating axially extending crests and troughs.

2. The exhaust diffuser of claim 1, wherein the flow ramp defines a continuous smooth surface in the circumferential direction, and the wavy portion extends axially downstream from the continuous smooth surface.

3. The exhaust diffuser of claim 2, wherein the flow ramp terminates at the radially outward point and the wavy portion comprises a ramp appendage having an upstream end attached to the flow ramp at the radially outward point, and the ramp appendage extends axially downstream from the flow ramp.

4. The exhaust diffuser of claim 3, wherein the continuous smooth surface of the flow ramp is oriented at a radial outward angle relative to a longitudinal axis of the exhaust diffuser, and the crests are defined by the ramp appendage and are oriented at generally the same angle as the continuous smooth surface of the flow ramp.

5. The exhaust diffuser of claim 4, wherein the troughs of the ramp appendage are oriented at a radial outward angle relative to the longitudinal axis of the exhaust diffuser that is less than the angle defined by the crests of the ramp appendage.

6. The exhaust diffuser of claim 4, wherein the troughs of the ramp appendage are oriented generally parallel to the longitudinal axis of the exhaust diffuser.

7. The exhaust diffuser of claim 2, wherein the wavy portion includes a first, upstream section formed in the flow ramp, located upstream from the downstream, radially outward point, the upstream section being defined by crests forming an axial extension of the continuous smooth surface and troughs forming axially extending recesses that extend in a radially inward direction relative to the crests.

8. The exhaust diffuser of claim 7, wherein the wavy portion includes a second, downstream section, and the second, downstream section defines crests and troughs extending axially from respective crests and troughs of the first, upstream section of the wavy portion.

9. The exhaust diffuser of claim 8, wherein the second, downstream section is formed by a ramp appendage having an upstream end attached to the flow ramp at the radially outward point and extending downstream from the flow ramp, wherein the ramp appendage defines crests and troughs extending axially from respective crests and troughs of the upstream section of the wavy portion.

10. The exhaust diffuser of claim 8, wherein the crests of the first, upstream section are oriented at a radial outward angle relative to a longitudinal axis of the exhaust diffuser, and the crests of the second, downstream section are oriented generally parallel to the longitudinal axis of the exhaust diffuser.

11. The exhaust diffuser of claim 1, wherein the crests and troughs of the wavy portion extend substantially the entire axial length of the flow ramp.

12. The exhaust diffuser of claim 1, wherein the crests and troughs of the wavy portion are oriented at an angle, in the circumferential direction, relative to the longitudinal axis.

13. A turbine exhaust diffuser for a gas turbine engine having a turbine section, the exhaust diffuser comprising:

a flowpath located downstream of the turbine section for receiving an expanding exhaust gases from the turbine section;

wherein the flowpath is defined at least in part by a turbine casing forming an OD flowpath boundary;

wherein the flowpath is defined at least in part by a hub forming an ID flowpath boundary;

a flow ramp positioned in the flowpath on the ID flowpath boundary, wherein the flow ramp extends circumferentially about the hub and includes a downstream, radially outward point that extends radially outward further from the ID flowpath boundary than an upstream, radially outward point that is positioned upstream from the downstream, radially outward point; and a wavy portion located at the downstream, radially outward point of the flow ramp, the wavy portion including a circumferentially extending, undulating surface defined by alternating axially extending crests and troughs, wherein the crests are oriented at a first radial outward angle relative to the longitudinal axis and the troughs are oriented at a second radial outward angle relative the longitudinal axis that is less than the first radial outward angle.

14. The exhaust diffuser of claim 13, wherein the flow ramp defines a continuous smooth surface in the circumferential direction, and the wavy portion extends axially downstream from the continuous smooth surface.

15. The exhaust diffuser of claim 14, wherein the flow ramp terminates at the radially outward point and the wavy portion comprises a ramp appendage having an upstream end attached to the flow ramp at the radially outward point, and the ramp appendage extends axially downstream from the flow ramp.

16. The exhaust diffuser of claim 15, wherein the continuous smooth surface of the flow ramp is oriented at a radial outward angle relative to a longitudinal axis of the exhaust diffuser, and the crests are defined by the ramp appendage and are oriented at generally the same angle as the continuous smooth surface of the flow ramp.

17. The exhaust diffuser of claim 16, wherein the troughs of the ramp appendage are oriented generally parallel to the longitudinal axis of the exhaust diffuser.

18. The exhaust diffuser of claim 14, wherein the wavy portion includes a first, upstream section formed in the flow ramp, located upstream from the downstream, radially outward point, the upstream section being defined by crests forming an axial extension of the continuous smooth surface and troughs forming axially extending recesses that extend in a radially inward direction relative to the crests.

19. The exhaust diffuser of claim 18, wherein the wavy portion includes a ramp appendage defining a second, downstream section, the ramp appendage having an upstream end attached to the flow ramp at the radially outward point and extending downstream from the flow ramp, wherein the ramp appendage defines crests and troughs extending axially from respective crests and troughs of the upstream section of the wavy portion.

20. The exhaust diffuser of claim 13, wherein the crests and troughs of the wavy portion extend substantially the entire axial length of the flow ramp.

* * * * *